United States Patent [19]

Grubbs et al.

[11] Patent Number: 4,945,144

[45] Date of Patent: Jul. 31, 1990

[54] RING OPENING METHATHESIS POLYMERIZATION OF STRAINED CYCLIC ETHERS

[75] Inventors: Robert H. Grubbs, South Pasadena; Bruce M. Novak, El Sobrante, both of Calif.

[73] Assignee: California Institute of Technology, Pasadena, Calif.

[21] Appl. No.: 407,881

[22] Filed: Sep. 15, 1989

Related U.S. Application Data

[60] Division of Ser. No. 371,982, Jun. 22, 1989, Pat. No. 4,883,851, and a continuation-in-part of Ser. No. 223,406, Jul. 25, 1988, abandoned.

[51] Int. Cl.$^5$ ............................................. C08F 24/00
[52] U.S. Cl. ...................................... 526/268; 526/90; 526/91; 526/93; 526/170; 526/171; 526/172; 525/338
[58] Field of Search .................... 526/268, 90, 91, 93, 526/170, 171, 172; 525/338

[56] References Cited

U.S. PATENT DOCUMENTS 3,367,924 2/1968 Rinehart et al. .................... 526/191
4,028,482 6/1977 Ueshima et al. .................... 526/271

OTHER PUBLICATIONS

Butler, G. B., Kresta, J. E., Edition: ACS Symposium Series 195, American Chemical Society, Washington D.C., 1982, *Biologically Active Synthetic Anionic Polymers*.

*Primary Examiner*—Joseph L. Schofer
*Assistant Examiner*—Alex H. Walker
*Attorney, Agent, or Firm*—David W. Collins

[57] ABSTRACT

A process is provided for the polymerization of 7-oxanorbornene and its derivatives. The process involves the ring opening metathesis of 7-oxanorbornene and its derivatives, preferably using water as the solvent. Such materials may be homopolymerized or, alternatively, copolymerized with other cyclic olefins such as norbornene. The resulting polymers are also novel.

3 Claims, 1 Drawing Sheet

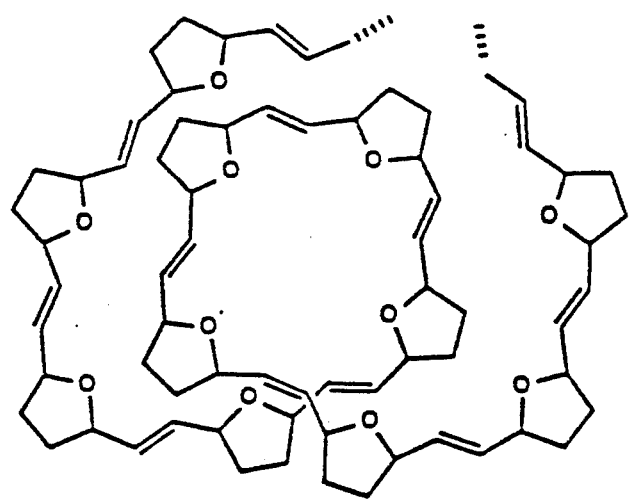

RING OPENING METHATHESIS POLYMERIZATION OF STRAINED CYCLIC ETHERS

ORIGIN OF INVENTION

The U.S. Government has rights in this invention pursuant to Grant No. GM-31332, awarded by the National Institute of Health.

CROSS-REFERENCE TO RELATED APPLICATION

This is a division of application Ser. No. 07/371,982, filed June 22, 1989, U.S. Pat. No. 4,883,851, which is a continuation-in-part application of Ser. No. 07/223,406, filed July 25, 1988, now abandoned.

TECHNICAL FIELD

The present invention relates to the polymerization of strained cyclic ethers, and, more particularly, to a process for polymerizing 7-oxanorbornene and its derivatives.

BACKGROUND ART

The poly(ethenylidene-co-2,5-tetrahydrofuran) materials resulting from the polymerization of 7-oxabicyclo[2.2.1]hept-5-ene (hereinafter, 7-oxanorbornene) monomers are of keen interest, due to their potential ionophoric properties. Molecular model studies indicate that these poly(7-oxanorbornene) polymers have the ability to form helical structures, with all of the tetrahydrofuran oxygen facing into the interior of the helix. This unique helical conformation may allow these polymers, when in solution, to act as useful acyclic ionophores, much like their cyclic analogues, the cyclic crown ethers. In addition, thin films composed of these poly(7-oxanorbornene) materials may posses oxygen-rich ionophoric channels that would enable them to act as ion permeable membranes.

Classical ROMP catalysts react with, and are deactivated by, the 1,4 bridging epoxide moiety present in the 7-oxanorbornane derivatives. For this reason, it is important to find catalysts capable of successfully polymerizing 7-oxanorbornene and its derivatives.

Attempts at the emulsion polymerization of various norbornene derivatives have been made; see R. E. Rinehart et al, "The Emulsion Polymerization of the Norbornene Ring System Catalyzed by Noble Metal Compounds", Polymer Letters, Vol. 3, pp. 1049-1052 (1965) and R. E. Rinehart, "Polymerizations Catalyzed by Noble Metal-Olefin Complexes", Journal of Polymer Science, Part C, No. 27, pp. 7-25 (1969). However, all of these polymerizations require the use of emulsifiers and various co-catalysts. When the polymerizations were attempted without these additives, no polymer was formed. Even with the added emulsifiers and added co-catalysts, the reported yields were typically less than 10%.

The benefits of emulsion polymerization systems are well documented. These benefits include ease of catalyst separation, good heat transfer during the reaction, ease of product manipulation, and kinetic parameters that allow for the production of high molecular weight materials. In addition, water is a desirable industrial solvent because of its cost, non-toxic nature and ease of disposal. All of the above reasons provide the impetus to find new catalytic systems that work well in water.

Thus, there remains a need for both a facile method of obtaining polymers of 7-oxanorbornene and its derivatives in high yields and the development of effective transition metal catalyzed emulsion polymerization systems.

Ring opening metathesis polymerization (ROMP) methods have been shown to be quite effective for the polymerization of strained cyclic, olefinic hydrocarbons. This technique has been expanded by the development of well-characterized alkylidene catalysts, which are able to produce living monodispersed polymers. These living polymers can be specifically end-capped with a variety of carbonyl compounds. The extension of ROMP methods, however, to monomers other than hydrocarbons has been significantly more challenging.

Metathesis polymerizations of monomers containing pendant functionalities have met with only limited success, and successful metathesis polymerizations of strained heterocyclic monomers are even more rare. These limitations are primarily the result of side reactions between the heteroatoms in the monomers and the typically oxophilic alkylidene ROMP catalysts.

DISCLOSURE OF INVENTION

In accordance with the invention, a process is provided for the polymerization of 7-oxanorbornene and its derivatives. The term derivative of 7-oxanorbornene is defined as limited to compounds containing the 7-oxanorbornene structure as supported by Formula II which shows this structure. The process involves the ring opening metathesis polymerization (ROMP) of 7-oxanorbornene and its derivatives, preferably using water as the solvent. Such materials may be homopolymerized or, alternatively, copolymerized with other cyclic olefins such as norbornene. The resulting polymers are also novel.

Traditional ROMP systems do not tolerate functional groups very well. However, as discovered by the present inventors, the 7-oxanorbornene derivatives, when combined with the appropriate catalyst, demonstrate that ROMP reactions need not be limited by the presence of functional groups in the monomers.

Several aspects of the invention are to be noted: (1) the novel polymeric materials that result from the ring opening metathesis polymerization of 7-oxanorbornene and its derivatives evidence ionophoric properties in solution and are suitably employed as ion permeable membranes; (2) the unusually high yields and activities observed for the aqueous polymerization of these materials; (3) the development of new catalysts for ROMP reactions in aqueous or organic solvents; and (4) the synthetic utility afforded by the activity of the recycled aqueous catalyst solutions resulting from the polymerization of these materials. With regard to point (4), these aqueous catalyst solutions actually become more active with use rather than less active.

BRIEF DESCRIPTION OF THE DRAWINGS

The sole FIGURE is a line drawing depicting an ion binding cavity formed from a helical turn of poly(7oxanorbornene).

BEST MODES FOR CARRYING OUT THE INVENTION

Norbornene (bicyclo[2.2.1]hept-5-ene) (I) and 7-oxanorbornene (7-oxabicyclo[2.2.1]hept-5-ene) (II) have the following structures:

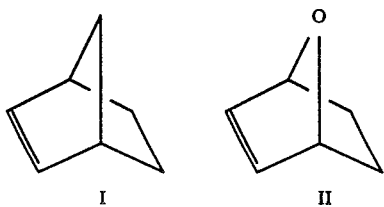

I   II

The ring opening metathesis polymerization (ROMP) of several 7-oxanorbornene derivatives has been accomplished using several catalysts in organic solvents. In addition, the polymerization can be successfully carried out in aqueous solution using $RuCl_3$ (hydrate) and $OsCl_3$ (hydrate) $K_2RuCl_5$ (hydrate), $[Ru(NH_3)_5Cl]Cl_2$, $[Ru(NH_3)_5(H_2O)](CH_3CO_2)_2$, $Ru_3O_2(NH_3)_{14}Cl_6$, $RuBr_3$ (hydrate), $Ru(H_2O)_6(ts)_2$ (ts = tosylate), cis-tetrakis(dimethylsulfoxide)dichlororuthenium (II), trans-tetrakis(dimethylsulfoxide)dibromoruthenium (II), and tetrakis(tetrahydrothiophene)dichlororuthenium (II). These polymerizations represent the first successful aqueous metathesis polymerization of an cyclic olefin without the use of added surfactants and/or added co-catalysts.

Equation (1) illustrates the ring opening metathesis polymerization of a generic derivative of 7-oxanorbornene:

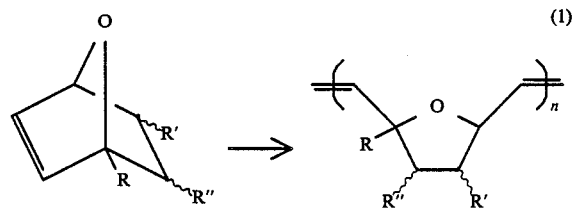

(1)

Table I below summarizes several of the 7-oxanorbornene derivatives successfully polymerized.

TABLE I

Derivatives of 7-Oxanorbornene

| Compound | R | R' | R" | Catalyst[c] |
|---|---|---|---|---|
| III | H | H | $CH_3$[a] | XI,XII,XIII,XIV,XV |
| IV | H | H | $CH_2OCH_3$[a] | XI,XII,XIII,XIV,XV |
| V | H | H | $CH_2OH$[a] | X,XII,XIII,XIV,XV |
| VI | H | $CH_2OH$ | $CH_2OH$[b] | XIII,XIV,XV |
| VII | H | $CH_2OTMS$ | $CH_2OTMS$[b] | XIII,XIV,XV |
| VIII | H | $CH_2OCH_3$ | $CH_2OCH_3$[b] | XI,XII,XIII,XIV,XV |
| IX | $CH_3$ | $CH_2OCH_3$ | $CH_2OCH_3$[b] | XII |
| X | $CH_2CH_3$ | $CH_2OCH_3$ | $CH_2OCH_3$[b] | XII |

[a]Endo/Exo = 3/1.
[b]Greater than 95% exo.
[c]Catalysts: XI = $((CH_3)_3CCH_2O)_2W(CH^t\text{-}Bu)Br_2$; XII = $((CF_3)_2(CH_3)CO)_2W(CH^tBu)((C_6H_3\text{-}2,6(CH(CH_3)_2)_2)N)$; XIII = $RuCl_3$; XIV = $Ru(1,5\text{-cyclooctadiene})Cl_3$; XV = $OsCl_3TMS$ = trimethyl silane.

In addition to the 7-oxanorbornene derivatives listed in Table I, four other 7-oxanorbornene derivatives have been polymerized:

dimethyl-7-oxanorbornadi-2,5-ene-2,3-dicarboxylate (XVI);

7-oxanorborn-5-ene-2,3-dicarboxylic anhydride (XVII);

1,4-epoxy-1,4-dihydronaphthalene (XVIII); and

N-methyl-7-oxanorborn-5-ene-2,3-dicarboximide (XIX).

Derivative XVI has been polymerized in organic solvents using XIII, XIV, XV, $K_2RuCl_5$, and $Ru(H_2O)_6Ts_2$ (Ts = tosylate). In addition, derivative XVI has been polymerized in aqueous solution using catalyst XIII, $K_2RuCl_5$ and $Ru(H_2O)_6Ts_2$. Derivative XVII has been polymerized in water using either $Ru(H_2O)_6Ts_2$, $K_2RuCl_5$ or the recycled aqueous catalyst solutions resulting from the polymerization of VIII using $K_2RuCl_5$ or $Ru(H_2O)_6Ts_2$. Derivative XVIII has been polymerized in organic solvents by catalysts XI, XII, XIII, XIV, and XV. In addition, XVIII has been copolymerized with XVI using catalyst XIII. Derivative XIX has been -polymerized in aqueous solution by $Ru(H_2O)_6Ts_2$, $K_2RuCl_5$, and the recycled aqueous catalyst solutions resulting from the polymerization of VIII using $K_2RuCl_5$ or $Ru(H_2O)_6Ts_2$.

The choice of catalyst employed is critical. Highly Lewis acidic transition metal compounds such as $WCl_6$ or $WOCl_4$ preferentially coordinate to, and cationically open, the 1,4-bridging epoxide moiety. Tungsten alkylidene catalysts XI and XII are more selective toward olefin metathesis, but are still subject to deactivating side reactions. These side reactions are more pronounced using catalyst XI, as evidenced by the production of only low molecular weight ($M_W$) oligomers (Table II, below).

TABLE II

Cis Double Bond Content, Ring Diad Tacticity, Molecular Weight and Polydispersity Index (PDI) of Poly-VIII Synthesized by Various Catalysts

| Catalyst | Solvent | % Cis | SYN/ISO | $M_w$ ($\times 10^3$) | $M_n$ ($\times 10^3$) | PDI |
|---|---|---|---|---|---|---|
| XI | $C_6H_6$ | 42 | — | 5.80 | 3.20 | 1.81 |
| XII | $C_6H_5CH_3$ | 93 | 55/45 | 29.4 | 19.4 | 1.52 |
| XIII | $C_6H_6$/EtOH; 5/1 | 7 | 28/72 | 338 | 172 | 1.97 |
| XIII | EtOH | 34 | — | 1120 | 973 | 1.15 |
| XIV | $C_6H_6$/EtOH | 18 | 50/50 | 133 | 77.6 | 1.71 |
| XV | $CH_3OH$ | 30 | — | 965 | 792 | 1.22 |

In addition to the catalysts described above, several other ruthenium salts have been found to catalyze the polymerization of 7-oxanorbornene derivatives in aqueous solution. Some of these salts are even more active than $RuCl_3$. Examples of such other salts include $K_2RuCl_5$(hydrate), $[Ru(NH_3)_5Cl]Cl_2$, Ruthenium Red $(Ru_3O_2(NH_3)_{14}Cl_6)$, $RuBr_3$(hydrate), $Ru(H_2O)_6Ts_2$, cis-tetrakis(dimethylsulfoxide)dichlororuthenium(II), trans-tetrakis(dimethylsulfoxide)dibromoruthenium(II), and tetrakis(tetrahydrothiophene)dichlororuthenium-(II).

Further, there may be many other Group VIII metal complexes, discussed further below, that will catalyze the ROMP reaction. Accordingly, such other catalysts that are subsequently found to effect the ring opening metathesis polymerization of 7- oxanorbornene and its derivatives are also contemplated as falling within the scope of this invention.

The successful polymerization of monomers containing reactive pendant functionalities (such as alcohols or carbonyl groups) is best achieved by the use of catalysts based on Group VIII metals such as ruthenium and osmium. Choice of the appropriate catalyst can potentially offer significant synthetic control over polymer characteristics such as the cis/trans ratios of the metathesized double bonds and ring diad tacticity.

Currently, five 7-oxanorbornene derivatives have been successfully polymerized in aqueous solution using RuCl₃ (hydrate), OsCl₃(hydrate), K₂RuCl₅(hydrate), [Ru(NH₃)₅Cl]-Cl₂, Ruthenium Red (Ru₃O₂(NH₃)₁₄Cl₆), RuBr₃(hydrate), Ru(H₂O)₆Ts₂, cis-tetrakis(dimethylsulfoxide)dichlororuthenium(II), trans-tetrakis(dimethylsulfoxide)dibromoruthenium(II), and tetrakis(tetrahydrothiophene)dichlororuthenium(II):

(1) 2,3-dicarbinol-7-oxabicyclo[2.2.1]hept-2-ene (VI),
(2) 2,3-dimethoxymethyl-7-oxabicyclo[2.2.1]hept-2-ene (VIII),
(3) dimethyl-7-oxanorbornadi-2,5-ene-2,3-dicarboxylate (XVI),
(4) 7-oxanorborn-5-ene-2,3-dicarboxylic anhydride (XVII), and
(5) N-methyl-7-oxanorborn-5-ene-2,3-dicarboximide (XIX).

Homo-polymerization of VI produces poly-VI as follows:

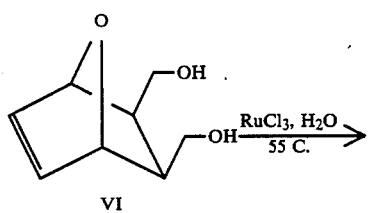

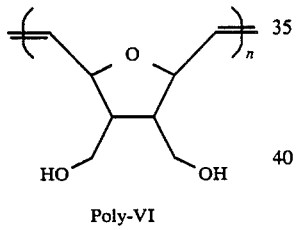

Poly-VI

Homo-polymerization of VIII produces poly-VIII as follows:

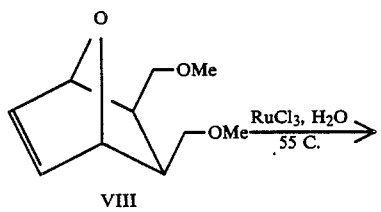

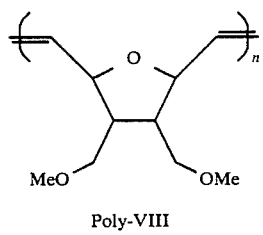

Poly-VIII

Homo-polymerization of XVI produces poly-XVI as follows:

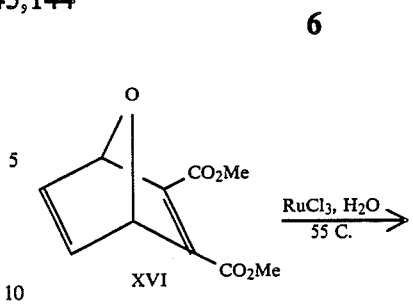

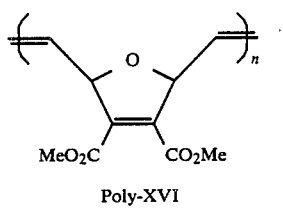

Poly-XVI

In addition, the aqueous catalyst solution that results from the polymerization of VIII using Ru(H₂O)₆Ts₂ catalyzes the polymerization of 7-oxanorborn-5-ene-2,3-dicarboxylic anhydride in aqueous solution. During the polymerization, the anhydride is hydrolyzed to the dicarboxylic acid derivative to provide the poly-acid. Homopolymerization of 7-oxanorborn-5-ene-2,3-dicarboxylic anhydride produces the polymer as follows:

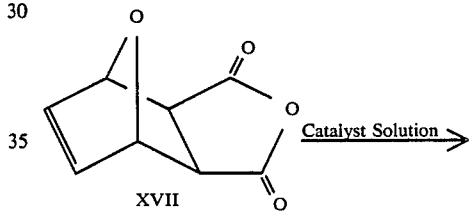

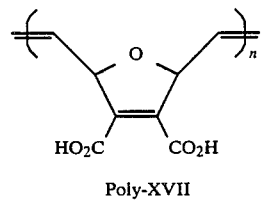

Poly-XVII

The same hydrolyzed polymer (poly-XVII) is obtained by using aqueous solutions of Ru(H₂O)₆Ts. The yield, however, using this catalyst is lower (typically 10 to 20%) than when the above-mentioned catalyst solution is used. When K₂RuCl₅ in water is used as the catalyst, near-quantitative yields of the di-acid polymer (poly XVII) are obtained.

The polymers obtained from the ROMP of XVII are of keen interest due to their structural similarity to a class of biologically active anionic polymers formed from the free radical polymerization of a mixture of maleic anhydride and divinyl ether; see, e.g., D. Breslow, "Biologically Active Synthetic Anionic Polymers" in *Cyclopolymerization and Polymers with Chain-Ring Structures*, ACS Symposium Series 195, G. B. Butler, Ed., 1982, p. 1.

The unsaturated poly-XVII can be hydrogenated to the fully saturated material using hydrazine-air in water. The saturated poly-XVII thus formed may also be of interest as a biologically active material.

Homo-polymerization of XIX produces poly-XIX as follows:

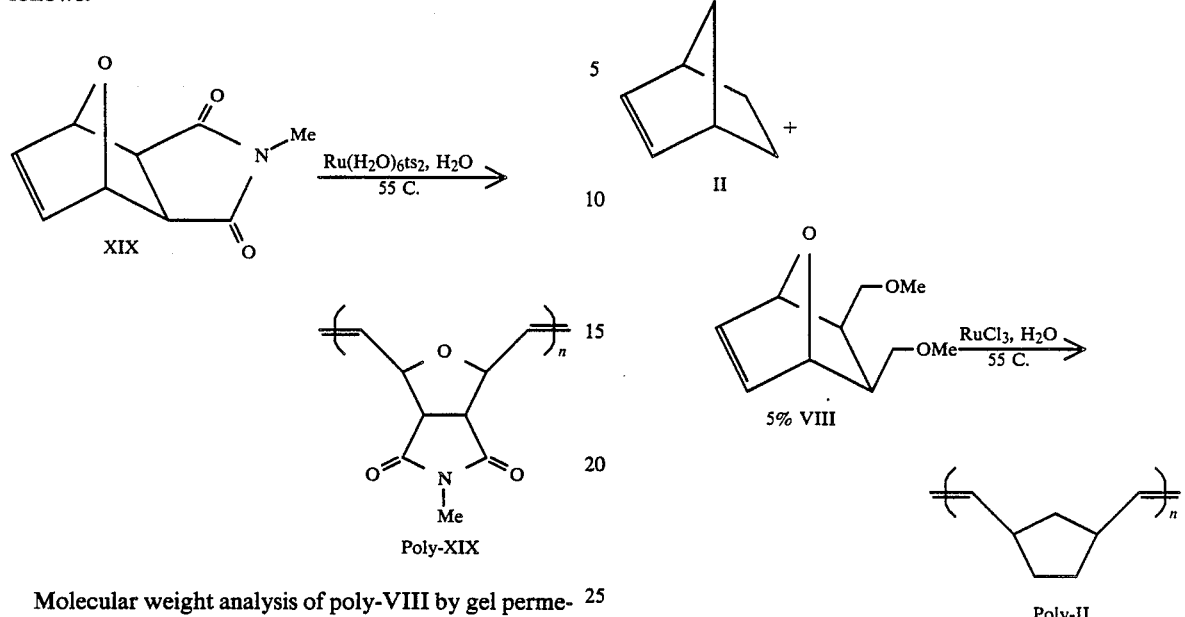

Molecular weight analysis of poly-VIII by gel permeation chromatography shows these materials to be high molecular weight polymers ($M_n = 1.3 \times 10^6$ relative to polystyrene standards) that demonstrate superior viscoelastic properties. The polymers obtained in these aqueous polymerizations have molecular weights approximately three times larger than the polymers obtained using the same catalysts in 5:1 benzene:ethanol solvent mixtures (a typical solvent mixture used in the past for the RuCl$_3$ and OsCl$_3$ catalysts).

The aqueous homo-polymerization of the 7-oxanorbornene monomers can be accomplished with or without the use of typical emulsifiers, two examples of which are sodium dodecyl sulfate and Triton X-100 (polyethylene glycol p-isooctylphenyl ether). The yield and molecular weight of the polymers obtained is approximately the same whether or not the emulsifier is used. Thus, common emulsifiers used in industrial processes do not kill these polymerizations.

In addition to the aqueous homo-polymerization of the 7-oxanorbornene derivatives, these water-soluble monomers can be used to initiate the polymerization of other strained cyclic olefins, such as norbornene, that are normally unreactive in homo-polymerizations under identical reaction conditions. Co-polymers of VIII and norbornene can be synthesized using these aqueous systems. The homo-polymerization of norbornene (II) by RuCl$_3$ (hydrate) in aqueous solution at 55° C. requires initiation times of greater than one week. However, norbornene when mixed with approximately 5% of monomer VIII (and SDS emulsifier) initiates and co-polymerizes with VIII in less than three hours. Yields of the polymer are low at this time, but optimization of the conditions is expected to increase the yield. Under the same reaction conditions but with no emulsifier present, initiation requires 1-2 days, and the polymer is all poly-norbornene (poly-II), with no detectable VIII incorporated.

Co-polymerization of about 5% VIII and norbornene (II) proceeds as follows to form poly-II:

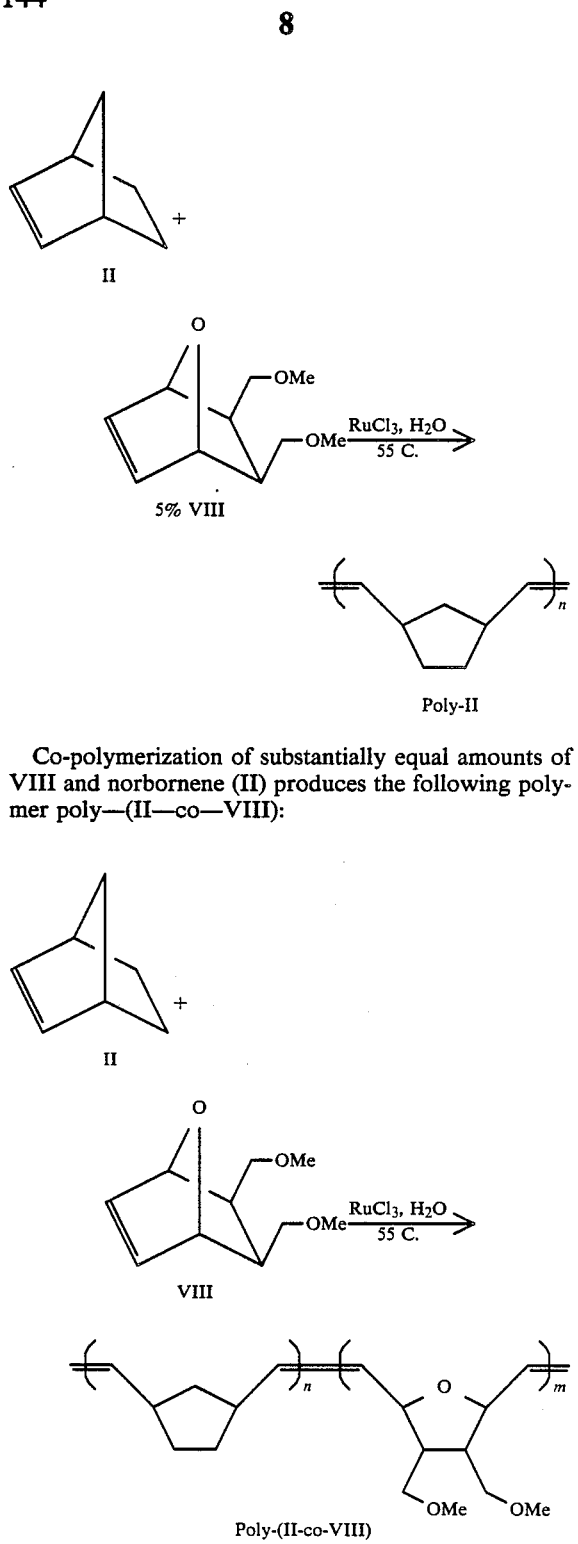

Co-polymerization of substantially equal amounts of VIII and norbornene (II) produces the following polymer poly—(II—co—VIII):

In addition to the above work, it has been discovered that the aqueous catalyst solutions resulting from the polymerization of VIII are extremely active in either subsequent polymerizations of other 7-oxanorbornene derivatives, or in the polymerization of other monomers that are normally reluctant to polymerize in aqueous systems. That is to say, instead of becoming less active with use, these aqueous solutions actually become more active. One individual catalyst solution was repeatedly recycled for fourteen successive polymerizations with no loss of catalytic activity. An example of the synthetic utility of these active, recycled catalyst solutions follows. 5norbornene-2-methanol will polymerize using $K_2RuCl_5$ in aqueous solution containing SDS to provide yields of typically only 5 to 10%. Under identical conditions, using $K_2RuCl_5$ obtained from a previous polymerization of VIII, the yields of polymer are better than 95%.

Similarly, the polymerization of N-methyl-5-norbornene-2,3-dicarboximide can be accomplished by re-using a catalyst solution obtained from the polymerization of VIII.

The 7-oxanorbornene polymers can be hydrogenated to give the fully saturated polymers The hydrogenation is best performed using p-toluenesulfonylhydrazide. Partial hydrogenation can be achieved using $H_2$ with Pd-C as a catalyst:

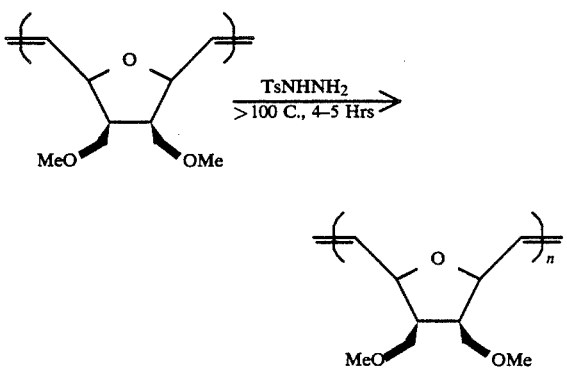

Table III below lists additional catalysts tried in the polymerization of 7-oxanorbornene monomers; those which successfully catalyze the polymerization reaction are denoted "Active", while those which do not catalyze the polymerization reaction are denoted "Inactive". No ordering or ranking is implied.

TABLE III

| Additional Catalysts Attempted for the Polymerization of 7-Oxanorbornene Monomers and Results | |
|---|---|
| Catalyst | Solvent(s) |
| Active: | |
| (NH4)2OsCl6 | W |
| RuO3(OH)2 | 18-C-6/M |
| Ru(Acac)3 | E, M |
| [Ru(NH3)5OAc]OAc2 | W |
| cis-(DMSO)4Ru(ts)2 | W |
| [(C6H6)RuCl]2 | M, E, W |
| RuHCl(PPh3)3 | CB, B |
| RuCl2(PPh3)3 | CB/B |
| Ru2(TFA)4 | CB/E, B/E, E |
| Inactive: | |
| K2OsO4 | 18-C-6/M |
| IrCl3 | CB/E, E, W |
| Cp2Ru | B, CB |
| RuO2 | CB/E, E |
| (bipy)3RuCl2 | E, W |
| (bipy)2RuCl2 | E, W |
| Ru(NO)Cl3 | W, E |
| Ru(NO)(NO3)3 | E, W |
| Ru3(CO)12 | CB |
| RuCl2(CO)3 | CB |
| RuH2(CO)(PPh3)3 | B |
| RuH(TFA)(CO)PPh3)3 | B |

TABLE III-continued

| Additional Catalysts Attempted for the Polymerization of 7-Oxanorbornene Monomers and Results | |
|---|---|
| Catalyst | Solvent(s) |
| RuH(OAc)(PPh3)3 | B |

Notes:
Solvents used: E = $C_2H_5OH$, M = $CH_3OH$, CB = $C_6H_5Cl$, B = $C_6H_6$, C = $CHCl_3$, W = $H_2O$, 18-C-6 = 18-Crown-6 (ether)
Cp = cyclopentadienyl
Acac = acetyl acetonate
Ac = acetate
bipy = bipyridyl
DMSO = dimethylsulfoxide
ts = tosylate
TFA = trifluoroacetate
PPh3 = triphenylphosphine A consideration of the foregoing catalysts (and the earlier discussion with regard to the ruthenium, osmium, and tungsten catalysts above) suggests that pi-acid ligands (electron acceptors) deactivate the catalysts, while sigma-donor ligands of ruthenium and osmium, such as halides, hydroxides, tosylates, and acetates, are suitably employed as catalysts in the practice of the invention. As to the tungsten catalysts, these preferably comprise 4-and 5-coordinated alkylidene ligands, with the further proviso that the tungsten catalysts do not require Lewis acid co-catalysts, which tends to deactivate the catalyst, as noted above. Since most 6-coordinated alkylidene ligands do require Lewis acid co-catalysts, such 6-coordinated tungsten catalysts do not appear to be generally usefully employed in the practice of the invention.

The foregoing considerations indicate the classes of catalysts that are likely to be utilized in the practice of the invention. Testing a specific catalyst within these classes is straight-forward and does not require undue experimentation, since the prospective catalyst is mixed with the monomer and it is readily apparent if the prospective catalyst is active by an increase in viscosity or by the formation of a latex.

Preliminary liquid/liquid and solid/liquid ion extraction experiments indicate that the polymers of the invention do indeed coordinate various cations. Poly-VIII will coordinate $Na^+$, $K^+$, and $Cs^+$ (but not $Li^+$) salts, as observed through solid/liquid extractions. Of greater interest, however, is the observation that the flexible binding cavities formed by poly-VIII will preferentially complex large polyaromatic cationic dyes such as methylene blue and rhodamine 6G. Poly-VIII demonstrates high selectivity by complexing only dyes comprised of large organic cations and small anions ($Cl^-$). Dyes comprised of $Na^+$and large aromatic anions are not complexed. This selectivity is exactly opposite to that observed for ion complexation using-18-Crown-6.

In addition to binding ions in solution, the polymers of the invention act as ion permeable membranes. Demonstration of ion transport through these ionophoric materials is obtained by placing solid membranes cast from the polymers between two ion concentration cells and measuring, by means of two SCE electrodes, the membrane potential resulting from diffusion of ions through the ionophoric membranes From the measured membrane potentials, cation transport numbers for $K^+$, $Na^+$, and $Li^+$ (all $Cl^-$ salts) were calculated to be 0.84, 0.73, and 0.73, respectively.

INDUSTRIAL APPLICABILITY

The aqueous polymerization of the 7-oxanorbornene derivatives represents the first metathesis polymerization to be carried out in water without the aid of added emulsifiers or co-catalyst reagents. Metathesis polymerizations are typically run using aromatic solvents such as benzene alone or as mixtures with various co-solvents The use of water as the solvent provides an extremely cheap and non-toxic alternative to organic solvents.

The 7-oxanorbornene derivatives act as initiation agents by promoting the polymerization of monomers such as norbornene that do not polymerize under the same aqueous conditions.

In addition, the polymers obtained from the aqueous homo-polymerization are high molecular weight materials that have good visco-elastic properties.

The polymers of the 7-oxanorbornene derivatives are expected to find use as ionophoric materials, as well as potential ion permeable membranes.

Materials formed from poly-XVII may have application as biologically active agents analogous to the maleic anhydride-divinyl ether polymers.

EXAMPLES

Non-Aqueous Polymerization:

A typical polymerization procedure is presented here for monomer VIII. All manipulations were performed under dry, inert atmosphere. Catalyst XI (87.0 mg, 0.148 mmol) was dissolved in dry benzene (1.0 ml). To this solution, olefin VIII (680 mg, 3.7 mmol, 25 equivalents) dissolved in benzene (1.0 ml) was added slowly via cannula. After 24 hours at room temperature, methanol (1.0 ml) was added to the reaction, the resulting solution cannulated into 50 ml pentane. The polymeric precipitate was isolated, redissolved in the minimum amount of $CCl_4$, and the insoluble catalyst residue filtered. The polymer (poly-VIII) was again precipitated by slow addition to pentane, filtered, and dried under vacuum to yield 410 mg (59% yield) of poly-VIII $^1$H NMR (90MHz, CDC13): 5.72, 5.58, 4.5, 4.22, 3.45, 3.34, 2.25 ppm. IR (thin film): 2090 (s), 1475 (m), 1390 (m), 1190 (s), 1100 (vs), 1018 (s), 963 (s) $cm^{-1}$.

The experimental procedure for catalyst XII follows the procedure outlined for catalyst XI, but with changes in reaction time and temperature. Reactions using catalyst XII (in concentrations similar to those outlined for catalyst XI) were run at temperatures in the range of $-20°$ C. to $25°$ C. Reactions times were usually 1 to 3 hours. The yields of poly-VIII obtained using XII typically ranged from 35 to 45%.

Polymerizations using XIII, XIV, and XV in benzene/-ethanol (5/1) mixtures were usually carried out between $50°$ C. and $75°$ C. (Catalyst XV will also polymerize VIII at room temperature as well). Reaction times varied with temperature and monomer concentrations. The results are depicted in Table IV below.

TABLE IV

Polymerization of VIII by Group VIII Metal Catalysts in Organic Solvent (Benzene/Ethanol, 5/1)

| Catalyst | Monomer Concentration | Temperature | Reaction Time | Yield |
|---|---|---|---|---|
| XIII | 1.45 M | 50° C. | 72 hrs | 95.2% |
| XIII | 2.42 M | 75° C. | 22 hrs | 94.7% |
| XIV | 2.25 M | 50° C. | 5 hrs | 77.9% |
| XV | 2.37 M | 50° C. | 1 hr | 94.1% |
| XV | 1.34 M | 27° C. | 11 hrs | 96.6% |

Aqueous Polymerization:

A typical aqueous polymerization procedure is presented here for monomer VIII. All manipulations were performed in the open air with no attempts to exclude oxygen from the reaction mixture. Catalyst XIII (10.2 mg) was dissolved in deionized water (3 ml) to provide a catalyst concentration of $3.4 \times 10^{-3}$ g/ml). Monomer VIII (0.500 ml, 580 mg, 3.15 mmol) was added and stirred vigorously to form an emulsion. The reaction vessel was then heated to $55°$ C. in an oil bath. After 25 minutes, the first polymer precipatate was noted. Within two additional minutes, the reaction vessel contained a large amount of polymer. It was observed that the initiation times varied sometimes from run to run; typical initiation times until the onset of polymerization were usually between 20 and 40 minutes. After a total of 40 minutes at $55°$ C., the reaction was allowed to cool to room temperature, and the aqueous catalyst solution decanted off the precipitated polymer. The polymer was then washed with eight 10 ml portions of water. During these washes, it was found important to wring out the rubber polymer to insure complete removal of the catalyst from the interior of the matrix. The polymer was then rapidly washed twice with acetone (two 10 ml portions), and dried under vacuum to yield 5.72 g (98.7% yield) of poly-VIII. $^1$H NMR (90 MHz, $CDCl_3$): 5.72, 5.58, 4.5, 4.22, 3.45, 3.34, 2.25 ppm. IR (thin film): 2090 (s), 1475 (m), 1390 (m), 1190 (s), 1100 (vs), 1018 (s), 963 (s) $cm^{-1}$.

The above aqueous procedure can be followed for all of the following catalysts: $RuCl_3$(hydrate), $OsCl_3$(hydrate), $K_2RuCl_5$(hydrate), $[Ru(NH_3)_5Cl]Cl_2$, Ruthenium Red ($Ru_3O_2(NH_3)_{14}Cl_6$), $RuBr_3$(hydrate), $Ru(H_2O)_6Ts_2$, cis-tetrakis(dimethylsulfoxide)dichlororuthenium(II), trans-tetrakis(dimethylsulfoxide)dibromoruthenium(II), and tetrakis(tetrahydrothiophene)dichlororuthenium(II). The initiation times (at $55°$ C.) vary with catalyst, from approximately three hours for $[Ru(NH_3)_5Cl]Cl_2$ and Ruthenium Red ($Ru_3O_2(NH_3)_{14}Cl_6$); 20 to 40 minutes for $RuCl_3$, $RuBr_3$, and $OsCl_3$, cis-tetrakis(dimethylsulfoxide)dichlororuthenium (II), trans-tetrakis(dimethylsulfoxide)dibromoruthenium (II), and tetrakis(tetrahydrothiophene)dichlororuthenium (II); 2 to 3 minutes for $K_2RuCl_5$; and 15 to 20 seconds for $Ru(H_2O)_6Ts_2$.

For all of the above catalysts, once initiation has occurred, the polymerization is usually complete in about 2 to 3 minutes. The aqueous catalyst solutions resulting from the polymerization of VIII by the above catalysts are far more active than the initial catalyst solutions. For example, "recycled" aqueous $RuCl_3$ solutions will initiate the polymerization of a second batch of VIII is less than 15 seconds at $55°$ C.

These recycled catalyst solutions will also do room temperature polymerizations of VIII. For example, initiation times for recycled $Ru(H_2O)_6Ts_2$ is less than one minute.

The temperature range explored to date has been between 10° C. and 85° C. This, however, does not represent an upper limit for these polymerizations. It is expected that these catalysts will operate at even higher temperatures. While the reactions are typically run at temperatures between about 55° C. and 60° C., the most active of the above catalysts will operate at room temperature. These include $OsCl_3$, $Ru(H_2)O_6Ts_2$, $K_2RuCl_5$, and all of the above listed "recycled" catalyst solutions. All of the above catalysts will provide near quantitative yields of the polymer product.

Aqueous Polymerization of Norbornene-2-methanol:

This example describes the formation of polymer within an emulsion, using a recycled catalyst solution.

Catalyst generation: To a solution of $K_2RuCl_5$ (16.6 mg in 1.0 ml deionized water; $1.66 \times 10^{-2}$ g/ml), monomer VIII (0.10 ml, 116 mg, 0.630 mmol) was added. The solution was heated to 55° C. for two hours. The solution was then cooled and the aqueous catalyst solution was decanted off of the poly-VIII precipitate. To the catalyst solution was added sodium dodecyl sulfate (SDS) (50 mg), and norbornene-2-methanol (NBM) (0.10 ml, 102.7 mg, 0.827 mmol). The reaction vessel was heated to 55° C. with stirring for 1 hour. The reaction was then cooled and the resulting poly-NBM was washed with water (five 3 ml portions) and acetone (two 3 ml portions) and then dried under vacuum to yield 95.2 mg poly-NBM (92.7% yield).

Ion Binding:

An efficient 1,3-dinitrobenzene "yes/no" screening test was employed to determine the presence of solubilized hydroxide salts in $CCl_4$ solutions containing poly(7-oxanorbornene). The formation of the red Meisenheimer hydroxide/dinitrobenzene complex upon addition of the solid hydroxide salt to the $CCl_4$/polymer solution indicated a positive ion binding result. The appropriate control experiments were run to eliminate the possibility of any spurious complexation results not mediated by the poly(7-oxanorbornene) polymers.

Control experiments were performed as follows: to each of four separate vessels containing a $CCl_4$ solution of 1,3-dinitrobenzene was added one of the following hydroxide salts: CsOH, KOH, NaOH, and LiOH. No color change was observed, indicating that no ions were stabilized in the $CCl_4$. Next, to a $CCl_4$ solution of poly-VIII, 1,3- dinitrobenzene was added. No color change was observed, indicating no impurity ions were present in the polymer. The solution turned red (indicating a positive result) only when both the polymer and the hydroxide salt were added to $CCl_4$ solutions of 1,3-dinitrobenzene.

Typical liquid/liquid extraction experiments were performed by extracting standardized aqueous dye solutions with solutions of the poly(7-oxanorbornene) polymers dissolved in either $CCl_4$ or benzene. Dye concentrations in the aqueous phase before and after the extractions were monitored by UV absorbence measurements.

The following data in Table V are presented for a liquid/liquid extraction of methylene blue (an organic cationic dye) from an aqueous solution to a $CCl_4$ solution of poly-VIII (concentration: 20 mg polymer/2 ml $CCl_4$). 18-Crown-6 is provided for comparison.

TABLE V

Phase Transfer of Methylene Blue (MB) into $CCl_4$ using Isomeric Forms of Poly-VIII.

| Host Agent | % Cis | Absorption Before | Absorption After | % MB Transferred |
|---|---|---|---|---|
| Poly-VIII | 93 | 2.59 | 0.122 | 95.3 |
| Poly-VIII | 42 | 2.59 | 0.469 | 81.9 |
| Poly-VIII | 5 | 2.59 | 0.678 | 73.8 |
| 18-Crown-6 | — | 2.59 | 2.59 | 0.0 |

Ion Transport through Membranes of Poly-VIII:

Using the generalized technique described below, ion transport through membranes comprising poly-VIII was measured for LiCl, NaCl, and KCl solutions. Membranes of poly-VIII were formed by dissolving poly-VIII in THF and depositing this solution on a gold mesh (1000 lines per inch). The THF was then evaporated. The solid membrane thus formed was then placed between two ion concentration cells. Both cells were filled with solutions containing 0.5 mM of one of the above salts. A Standard Calamol Electrode (SCE) was placed in each cell, and connected to a voltmeter. The voltmeter was then zeroed. The salt solution on one side of the membrane was then varied and the resulting membrane potential measured.

From a plot of membrane potential vs. the log of the concentration gradient, the slope of the line provides the cation and anion transport numbers. For a membrane comprising poly-VIII, cation transport numbers for $K^+$, $Na^+$, and $Li^+$ (all $Cl^-$ salts) were calculated to be 0.84, 0.73, and 0.73, respectively.

Thus, there has been disclosed a process for preparing polymers of 7-oxanorbornene and its derivatives comprising selective ring opening metathesis polymerization thereof in solution in the presence of a catalyst. It will be apparent to those of ordinary skill in the art that various changes and modifications of an obvious nature may be made without departing from the spirit and scope of the invention, as defined by the appended claims.

What is claimed is:

1. A process of initiating polymerization of a strained cyclic olefin comprising contacting said olefin with a dilute aqueous solution of a derivative of 7-oxanorbornene.

2. The process of claim 1 wherein said derivative of 7-oxanorbornene is selected from the group consisting of
   3-methyl-7-oxabicyclo[2.2.1]hept-2-ene;
   3-methoxymethyl-7-oxabicyclo[2.2.1]hept-2-ene;
   3-carbinol-7-oxabicyclo[2.2.1]hept-2-ene;
   2,3-dicarbinol-7-oxabicyclo[2.2.1]hept-2-ene;
   2,3-di(trimethylsilylmethyl)-7-oxabicyclo[2.2.1]-hept-2-ene;
   2,3-dimethoxymethyl-7-oxabicyclo[2.2.1]hept-2-ene;
   1-methyl-2,3-dimethoxymethyl-7-oxabicyclo[2.2.1]-hept-2-ene;
   1-ethyl-2,3-dimethoxymethyl-7-oxabicyclo[2.2.1]-hept-2-ene;
   dimethyl-7-oxanorbornadi-2,5-ene-2,3-dicarboxylate;
   7-oxanorborn-5-ene-2,3-dicarboxylic anhydride;
   1,4-epoxy-1,4-dihydronaphthalene; and
   20 N-methyl-7-oxanorborn-5-ene-2,3-dicarboximide.

3. The process of claim 2 wherein said derivative is 2,3-dimethoxymethyl-7-oxabicyclo[2.2.1]hept-2-ene and said olefin is selected from the group consisting of said derivatives.

* * * * *